(12) United States Patent (10) Patent No.: US 7,908,664 B2
Kishimoto (45) Date of Patent: Mar. 15, 2011

(54) DATA DELIVERY APPARATUS AND DATA DELIVERY METHOD

(75) Inventor: Hiroaki Kishimoto, Warabi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1231 days.

(21) Appl. No.: 11/469,137

(22) Filed: Aug. 31, 2006

(65) Prior Publication Data

US 2007/0081399 A1 Apr. 12, 2007

(30) Foreign Application Priority Data

Sep. 12, 2005 (JP) ................................. 2005-264424

(51) Int. Cl.
*G11C 7/10* (2006.01)
*H04N 1/32* (2006.01)
*H04L 9/32* (2006.01)
(52) U.S. Cl. .................. 726/27; 726/6; 726/28; 726/29; 713/168; 713/169; 709/229; 709/248; 707/9; 707/10; 365/189.05
(58) Field of Classification Search ...................... 726/27
See application file for complete search history.

(56) References Cited

U.S. PATENT DOCUMENTS

| 6,021,429 | A  | * | 2/2000  | Danknick | 709/208 |
| 6,247,043 | B1 | * | 6/2001  | Bates et al. | 709/200 |
| 6,269,369 | B1 | * | 7/2001  | Robertson | 1/1 |
| 6,662,228 | B1 | * | 12/2003 | Limsico | 709/225 |
| 7,130,066 | B1 | * | 10/2006 | Kanematu | 358/1.15 |
| 7,461,172 | B2 | * | 12/2008 | Newman et al. | 709/246 |
| 2002/0024685 | A1 |   | 2/2002 | Sasaki et al. | 358/402 |
| 2003/0084049 | A1 | * | 5/2003 | Wiley | 707/10 |
| 2004/0052356 | A1 | * | 3/2004 | McKinzie et al. | 379/355.02 |
| 2004/0139231 | A1 | * | 7/2004 | Newman et al. | 709/246 |
| 2006/0036547 | A1 | * | 2/2006 | Yasuhara | 705/44 |
| 2006/0105714 | A1 | * | 5/2006 | Hall et al. | 455/41.3 |

FOREIGN PATENT DOCUMENTS

EP 1 160 673 A1 12/2001

(Continued)

OTHER PUBLICATIONS

Hewlett-Packard Dev. Corp., L.P., 'hp mfp digital sending software v. 4.0 [support]', Edition 4, Mar. 2004, entire document, http://www.laserexp.com/PDFs/DSS%20Guide.pdf.*
Mar. 14, 2008 Communication (Extended European Search Report) in European Patent Appln. No. 06120404.6.

*Primary Examiner* — Edan Orgad
*Assistant Examiner* — Ronald Baum
(74) *Attorney, Agent, or Firm* — Fitzpatrick, Cella, Harper & Scinto

(57) ABSTRACT

A data delivery apparatus including a storage adapted to store limited-access data which associates user data for specifying a user, with data, access to which is permitted or limited to the user; a function determination unit adapted to determine whether a destination device to which the limited-access data is to be transmitted has an access control function of permitting or limiting access to the limited-access data for each user; an authentication unit adapted to, when the limited-access data destination device is determined not to have the access control function, request input of authentication information and performing an authentication process using the input authentication information; and a transmission control unit adapted to, when the authentication process by said authentication unit is successful, transmitting the limited-access data to the destination device.

13 Claims, 16 Drawing Sheets

FOREIGN PATENT DOCUMENTS

| | | |
|---|---|---|
| EP | 1 320 008 A2 | 6/2003 |
| EP | 1 427 166 A2 | 6/2004 |
| JP | 2000-165591 | 6/2000 |
| JP | 2001-24691 | 1/2001 |
| JP | 2002-232585 | 8/2002 |
| JP | 2005-026876 | 1/2005 |
| KR | 10-2001-0114190 A | 12/2001 |

* cited by examiner

F I G. 5
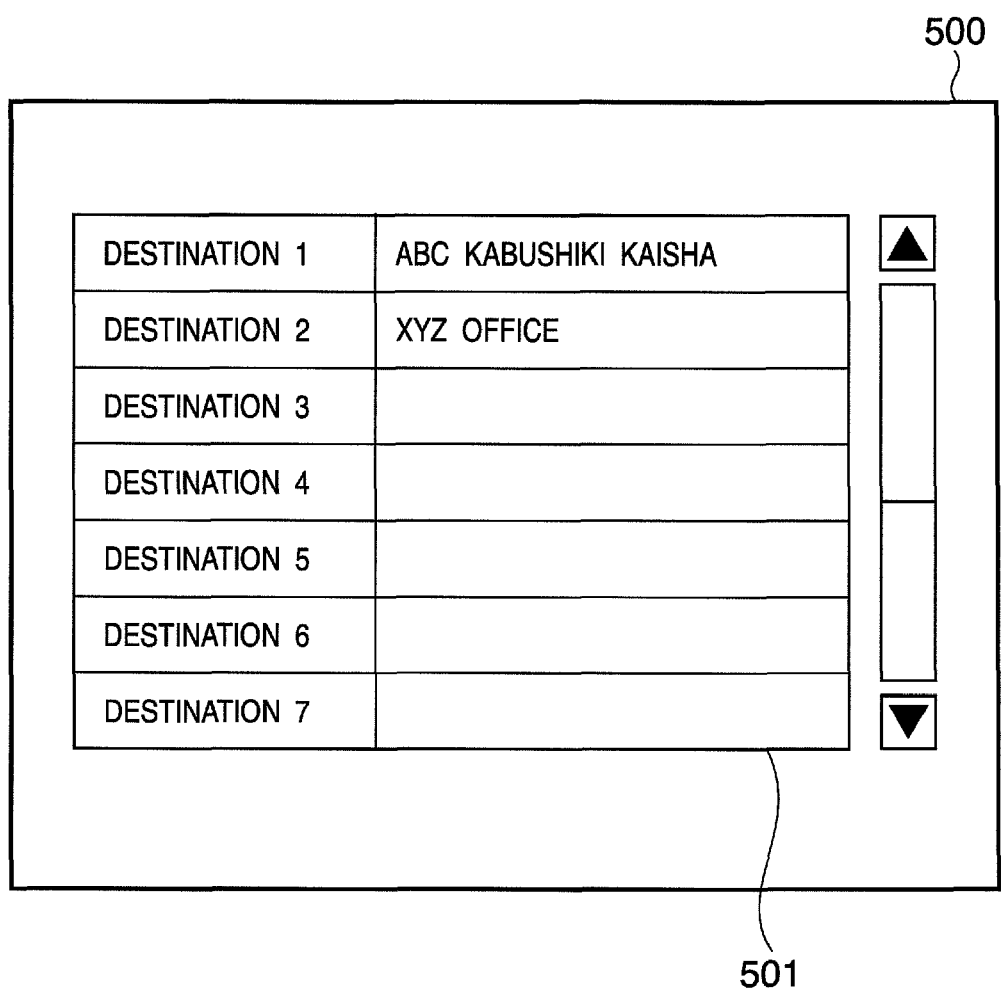

FIG. 9D

| DEVICE IDENTIFIER | FUNCTION INFORMATION |
|---|---|
| ADDRESS OF COPYING APPARATUS 102 | WITH ACCESS CONTROL FUNCTION |
| ADDRESS OF COPYING APPARATUS 103 | WITHOUT ACCESS CONTROL FUNCTION |
|  |  |

941 — DEVICE IDENTIFIER
942 — FUNCTION INFORMATION

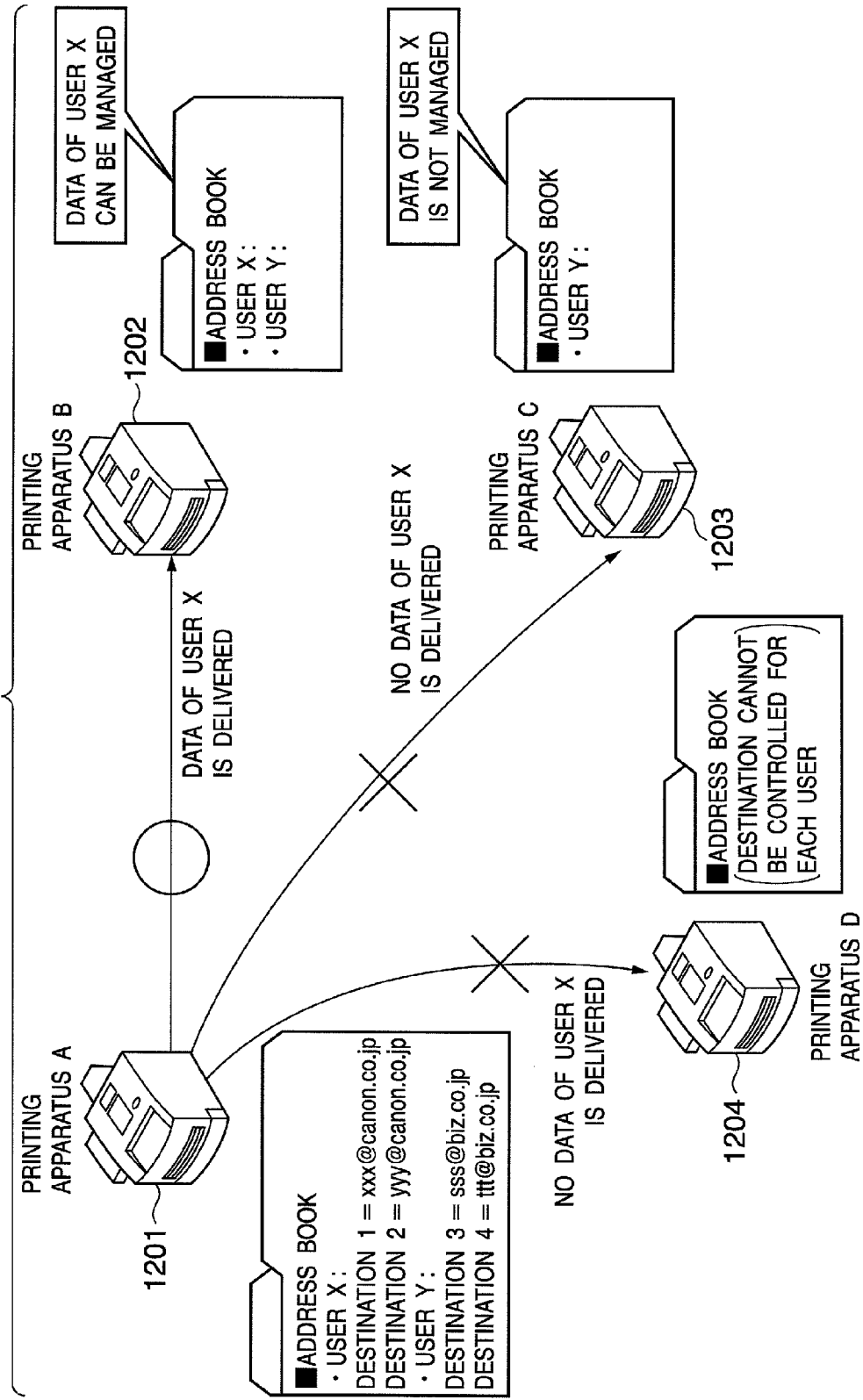

DATA DELIVERY APPARATUS AND DATA DELIVERY METHOD

BACKGROUND OF THE INVENTION

1. Field of the Invention

The present invention relates to a data delivery apparatus and data delivery method capable of maintaining synchronization of information, and maintaining the security of information while delivering the information.

2. Description of the Related Art

Recently, printers, copying machines, facsimile machines, multifunction devices having these functions, and the like are sometimes connected to a network. These devices (called network devices) connected to the network, particularly, the facsimile machine and multifunction device, hold various data such as data on network settings, and address book data containing E-mail destination information and facsimile destination information. Some network devices have a function of controlling address book data for each user. The function of controlling an address book for each user is a function of limiting accessible address book data for each user. A device having this function requests a user to input a password and authenticate when the user tries to access address book data. Only when authentication is successful is the user permitted to access address book data within the range in which the user is permitted to access. As a technique of sharing an address book between a plurality of network devices, there is proposed a method of delivering the latest address book data to network devices and thereby synchronizing address book data of the respective devices. For example, Japanese Patent Laid-Open No. 2002-232585 proposes a method of updating a telephone book using electronic mail. According to this method, when a telephone book is described in electronic mail text and transmitted from the source, the receiving device detects a specific identifier which is contained in the electronic mail text and which corresponds to partner information. The device registers text information following the identifier as partner information in the telephone book.

When data to be delivered is data such as personal data requiring access limitation, and the data is delivered using the technique described in Japanese Patent Laid-Open No. 2002-232585, access to the delivered data may not be limited in a destination network device. For example, when the destination network device does not have a function of limiting access to an address book for each user, i.e., a control function for each user, any user can access the address book even if received data can be registered in the address book.

As described above, even if each network device can control address book data for each user, control of address book data for each user is broken by delivering the data to another device. This problem is not limited to address book data, but also occurs in delivering other types of data such as personal data requiring access limitation. The network device is not limited to a copying machine, facsimile machine, printing apparatus, or multifunction device, and the same problem arises in other types of devices which control data requiring access limitation.

SUMMARY OF THE INVENTION

The present invention has been made to overcome the conventional drawbacks, and has as its object to provide a data delivery apparatus and data delivery method capable of, when limited-access data is delivered from one device to another device, limiting delivery in accordance with the function of the destination device, and thereby maintaining access limitation on the delivered data, and to provide a program for implementing the data delivery apparatus and data delivery method.

In order to achieve the above object, according to the first aspect of the present invention, a data delivery apparatus comprises a storage adapted to store limited-access data which associates user data for specifying a user, with data, access to which is permitted or limited to the user, a function determination unit adapted to determine whether a destination device to which the limited-access data is to be transmitted has an access control function of permitting or limiting access to the limited-access data for each user, an authentication unit adapted to, when the limited-access data destination device is determined not to have the access control function, request input of authentication information and performing an authentication process using the input authentication information, and a transmission control unit adapted to, when the authentication process by the authentication unit is successful, transmit the limited-access data to the destination device.

In order to achieve the above object, according to the second aspect of the present invention, a data delivery apparatus comprises a storage adapted to store limited-access data which associates user data for specifying a user, with data, access to which is permitted or limited to the user;

a function determination unit adapted to determine whether a destination device to which the limited-access data is to be transmitted has an access control function of permitting or limiting access to the limited-access data for each user; and a transmission control unit adapted to, when the function determination unit determines that the limited-access data destination device does not have the access control function, inhibit transmission of the limited-access data, and when the function determination unit determines that the limited-access data destination device has the access control function, transmit the limited-access data to the destination device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing the address book window of a copying apparatus 103 in the information delivery system according to the present invention;

FIG. 9D is a table showing still another example of the address book data and destination information;

FIG. 12 is a view for explaining an outline of the present invention.

DESCRIPTION OF THE EMBODIMENTS

An outline of the present invention will be described with reference to FIG. 12. In FIG. 12, destinations 1 and 2, access to which is permitted to user X, and destinations 3 and 4, access to which is permitted to user Y, are registered as address book data in a printing apparatus A 1201. When address book data is to be delivered from the printing apparatus A 1201, it is determined whether the destination printing apparatus has a function of controlling address book data for each user. A printing apparatus B 1202 serving as the destination has the function of controlling address book data for each user. In addition, both users X and Y are registered in address book data. Thus, the printing apparatus A 1201 can deliver all destination data associated with users X and Y to the printing apparatus B 1202. To the contrary, a printing apparatus D 1204 does not have the function of controlling address book data for each user. Thus, the printing apparatus A 1201 cannot deliver address book data to the printing apparatus D 1204, or can deliver it only when an authentic operator performs a delivery operation. The authenticity of the operator is verified using authentication information such as a password. A printing apparatus C 1203 has the function of controlling address book data for each user, but a user registered in address book data is only user Y. For this reason, the printing apparatus A 1201 cannot deliver destination data associated with user X to the printing apparatus C, or can deliver it only when an authentic operator performs a delivery operation. The present invention will be described in more detail below.

First Embodiment

Figure 1:
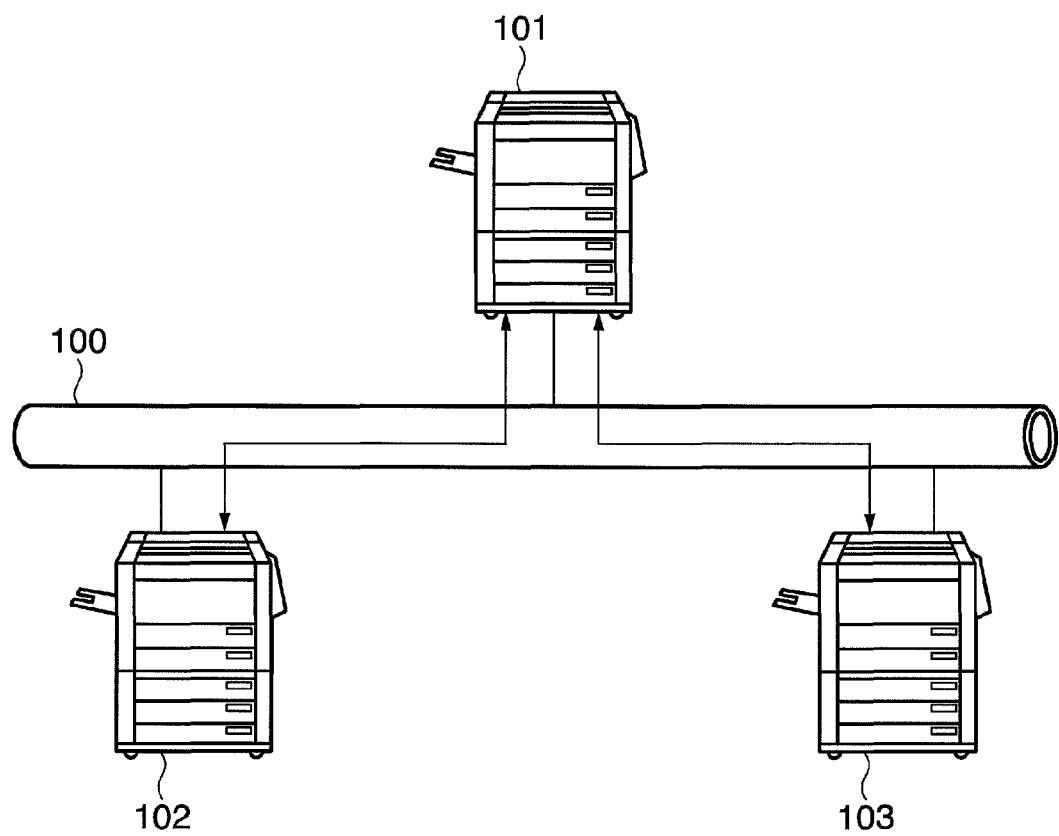
FIG. 1 is a view showing the configuration of an information delivery system according to an embodiment of the present invention.

FIG. 1 shows an information delivery system according to the first embodiment of the present invention. In the first embodiment, limited-access data, access to which is permitted or limited for each user, is an information delivery target. As an example of the limited-access data, the first embodiment will exemplify address book data saved in a copying apparatus serving as a network device. Destination data contained in the address book data is used as a transmission destination when document data obtained by scanning a document by the copying apparatus or document data saved in the copying apparatus is transmitted using a transmission means such as facsimile or electronic mail (E-mail).

FIG. 1 is a view showing the connection form of copying apparatuses 101 to 103. The copying apparatus 101 can deliver address book data stored in it to the copying apparatuses 102 and 103 via a network 100. In other words, address book data is compatible between the copying apparatuses. Compatibility can be maintained by unifying the formats of address book data saved in the respective copying apparatuses. Even if the save formats of the copying apparatuses are different, address book data can be delivered as far as their delivery data formats are compatible. As a method for delivery, tags representing destination data and user data contained in address book data are defined using XML. The user data is data which defines the access right and authentication information of the user. Tags represent the meanings of information to be transmitted, and a copying apparatus which receives the XML data can identify the tags and reconstruct the address book data. The copying apparatuses must share the meanings of tags, which can be implemented by separately defining the namespace. Saved address book data may also be described in XML. In this manner, address book data can be delivered.

The copying apparatuses 101 and 102 can control destination data for each user. More specifically, address book data is a database which associates user data for specifying the access right of a user with destination data, access to which is permitted for each user. With this function, the copying apparatuses 101 and 102 can limit destination data, access to which is permitted for each user. In the first embodiment, data, access to which is limited, will be called limited-access data. In the address book data according to the first embodiment, a user and destination data, access to which is permitted to the user, are associated with each other. To the contrary, a user and destination data, access to which is inhibited to the user, may also be associated with each other. In either case, a user and his accessible range must be associated with each other. In the copying apparatuses 101 and 102, not all destination data have access limitation for each user. The address book data may contain destination data which can be accessed by unspecified users.

In contrast, the copying apparatus 103 cannot control destination data for each user. That is, address book data saved in the copying apparatus 103 can be accessed-by unspecified users.

<Configuration of Copying Apparatus>

Figure 2:
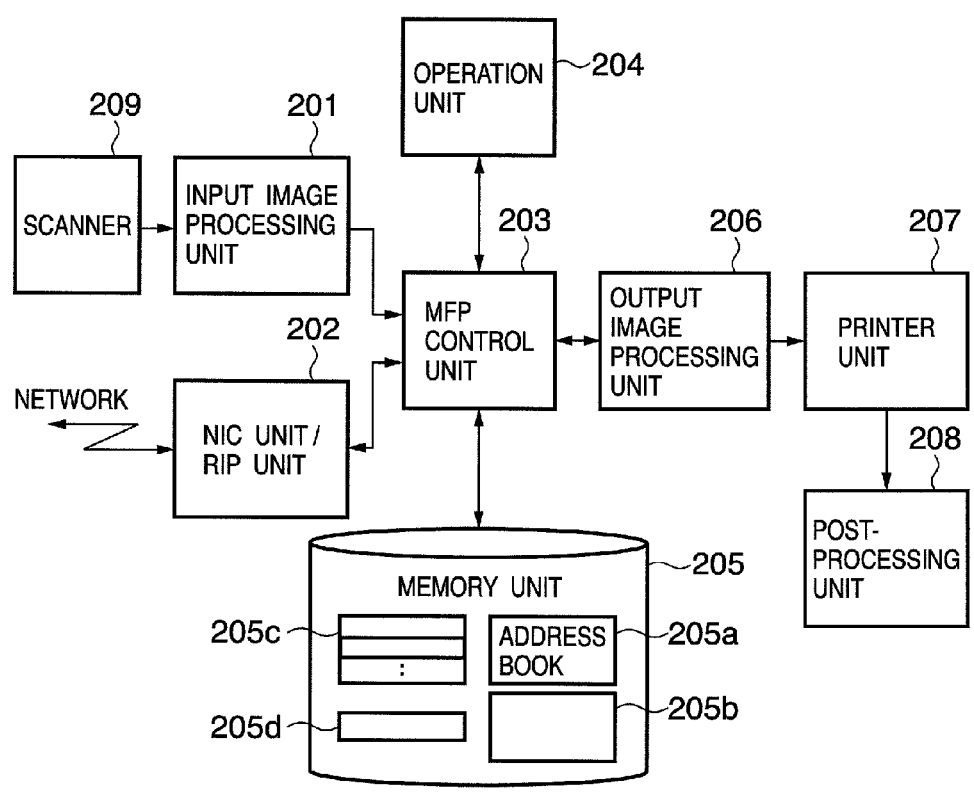
FIG. 2 is a block diagram showing a copying apparatus according to the present invention.

FIG. 2 is a block diagram showing the copying apparatus. In FIG. 2, an input image processing unit 201 reads a paper document or the like by an image reading device such as a scanner 209, and processes the read image data. A NIC (Network Interface Card) unit/RIP unit 202 includes a NIC unit and RIP unit. The NIC unit is an interface for connecting to a network. The NIC unit transfers, to the RIP unit, image data (mainly PDL data) input via the network, and externally transmits image data and apparatus information in the MFP via the network. The RIP unit decrypts input PDL (Page Description Language) data, and performs RIP (Raster Image Processor) expansion for the data (i.e., generates raster bitmap data (to be simply referred to as image data hereinafter)). Image data processed by the RIP unit or input image data is sent to an MFP control unit 203.

The MFP control unit 203 plays a role of controlling input data and output data. Image data input to the MFP control unit 203 is temporarily stored in a memory unit 205. The stored image data is read out, as needed. The MFP control unit 203 incorporates a processor (not shown). The processor executes a program to perform processes such as control of address book data, transmission of electronic mail to a destination contained in address book data, and facsimile transmission to a facsimile number contained in address book data. Control of address book data includes delivery of address book data to another copying apparatus (which will be described with reference to FIG. 6), and reception of address book data (which will be described with reference to FIGS. 7A and 7B), in addition to editing of address book data.

The memory unit 205 stores address book data 205a, a program 205b (containing procedures in FIGS. 6, 7A, and 7B) for controlling the address book data 205a, and password data 205c serving as authentication information (or part of it) which is referred to in delivering the address book data. The password data 205c is not authentication information for accessing an address book by the user, but information for controlling address book data. The memory unit 205 also stores destination information 205d. A device identifier for specifying a destination copying apparatus, and function information representing the function of the destination copying apparatus are registered in the destination information 205d. The registered function information contains information representing whether the target copying apparatus has the address book function, and when the target copying apparatus has the address book function, whether it has the access control function. The access control function is to permit or limit access to limited-access data such as address book data for each user. Such information is binary and can be represented by a flag or the like. Each copying apparatus is represented by a device identifier, e.g., an address (IP address) for specifying it. The address and the flag are saved in association with each other to make a destination copying apparatus and its function correspond to each other. The destination information 205d containing the device identifier and function information is input by the administrator or the like from an operation unit 204, and saved in the memory unit 205. The password data 205c is also registered in advance from the operation unit 204 and saved in the memory unit 205. Needless to say, the password data 205c can also be registered from a personal computer or the like via the network.

An output image processing unit 206 performs an image process for printing on image data, and sends the processed image data to a printer unit 207. The image process includes processes such as quantization (binarization) and pseudo halftoning. The printer unit 207 feeds sheets, and sequentially forms image data processed by the output image processing unit 206 on the sheets. The sheet bearing the image is sent to a post-processing unit 208, and undergoes a sheet sorting process, sheet finishing process, and the like. The printer unit 207 comprises a printer control unit 210 for controlling the operation of the printer unit 207. The operation unit 204 allows the user to select various functions and the like and designate an operation.

The operation unit 204 is made up of a key input unit and touch panel unit. When the user operates the touch panel according to a predetermined sequence, he can transmit electronic mail or a facsimile. When a destination is input, the user can refer to address book data. However, the user can refer to only destination data, access to which is permitted (or access to which is not inhibited). Destination data (to be referred to as unlimited-access destination data) which can be referred to by unspecified users does not particularly require user authentication. On the contrary, for limited-access destination data, pieces of authentication information input by the user, e.g., the user identifier and password are collated with authentication information stored in advance. If the two pieces of authentication information coincide with each other, i.e., authentication is successful, destination data are displayed on the touch panel within the range permitted to the user. The user can select a desired destination from the displayed destination data, and transmit electronic mail or a facsimile. In implementation, when the user designates reference to address book data, he is requested to input authentication information such as a user identifier and password. If authentication fails or a message that no authentication is performed is input, only unlimited-access destination data are displayed. If authentication is successful, destination data, access to which is permitted to the user, are displayed in addition to the unlimited-access destination data. This is merely an example, the implementation can take various forms as far as an unauthenticated user is inhibited from accessing limited destination data.

Figure 3:
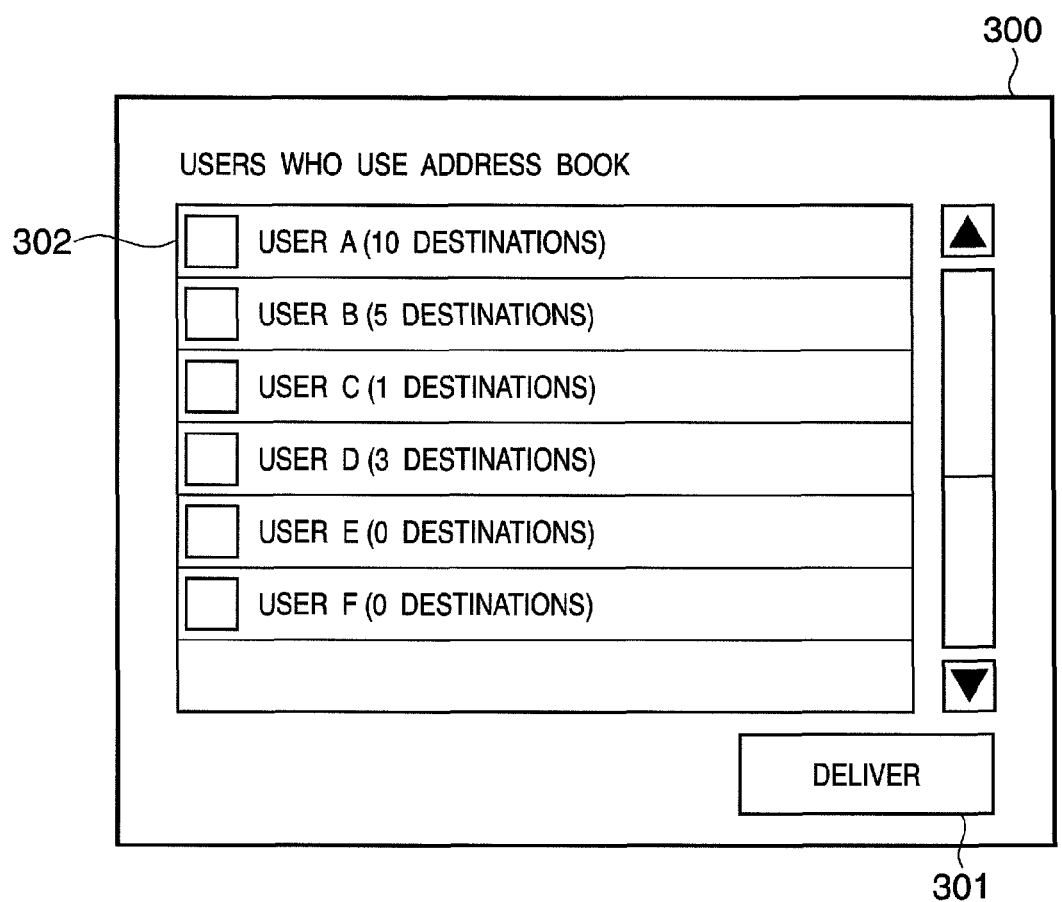
FIG. 3 is a view showing the address book control window of a copying apparatus 101 in the information delivery system according to the present invention.

FIG. 3 shows an address book data control window displayed on the operation unit 204 of the copying apparatus 101 in FIG. 1. Address book data in the copying apparatus 101 is controlled for each user. In this case, destination data associated with users A to F are stored. Each of users A to F can refer to only destination data associated with himself. A window 300 in FIG. 3 displays a user display field 302. When the user selects the field, he is requested to input authentication information. If authentication is successful, the selected destination data is displayed in the window. If the user presses a delivery button 301, the address book data is delivered to another copying apparatus specified by the destination information 205d.

Figure 4:
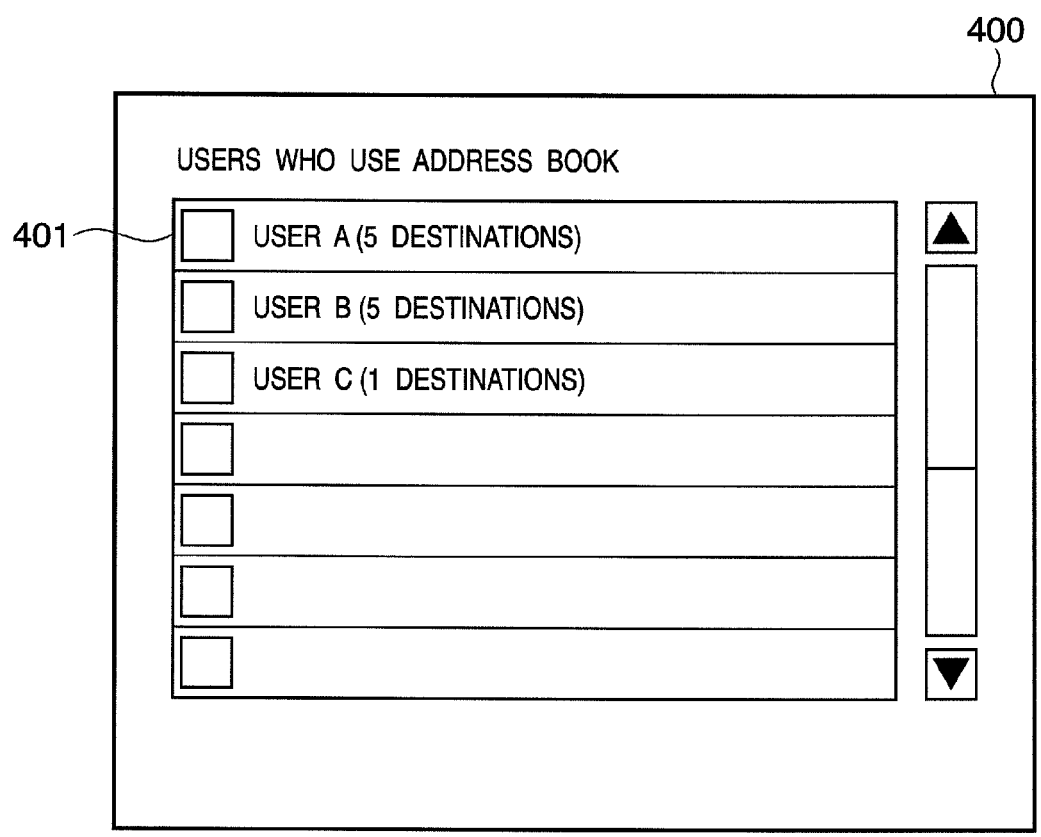
FIG. 4 is a view showing the address book control window of a copying apparatus 102 in the information delivery system according to the present invention.

FIG. 4 shows an address book control window displayed on the operation unit 204 of the copying apparatus 102 in FIG. 1. Address book data in the copying apparatus 102 stores destination data of users A, B, and C, but does not store those of users D, E, and F. Users D, E, and F cannot use destination data in the copying apparatus 102 unless each user registers destination data.

FIG. 5 shows an address book displayed on the operation unit 204 of the copying apparatus 103 in FIG. 1. Address book data in the copying apparatus 103 are not controlled for each user, and any user who uses the copying apparatus 103 can refer to and utilize all destination data. That is, address book data in the copying apparatus 103 is unlimited-access data. In the first embodiment, the copying apparatus 103 does not have the access control function, and cannot control destination data for each user.

<Data Structure>

Figure 9A:
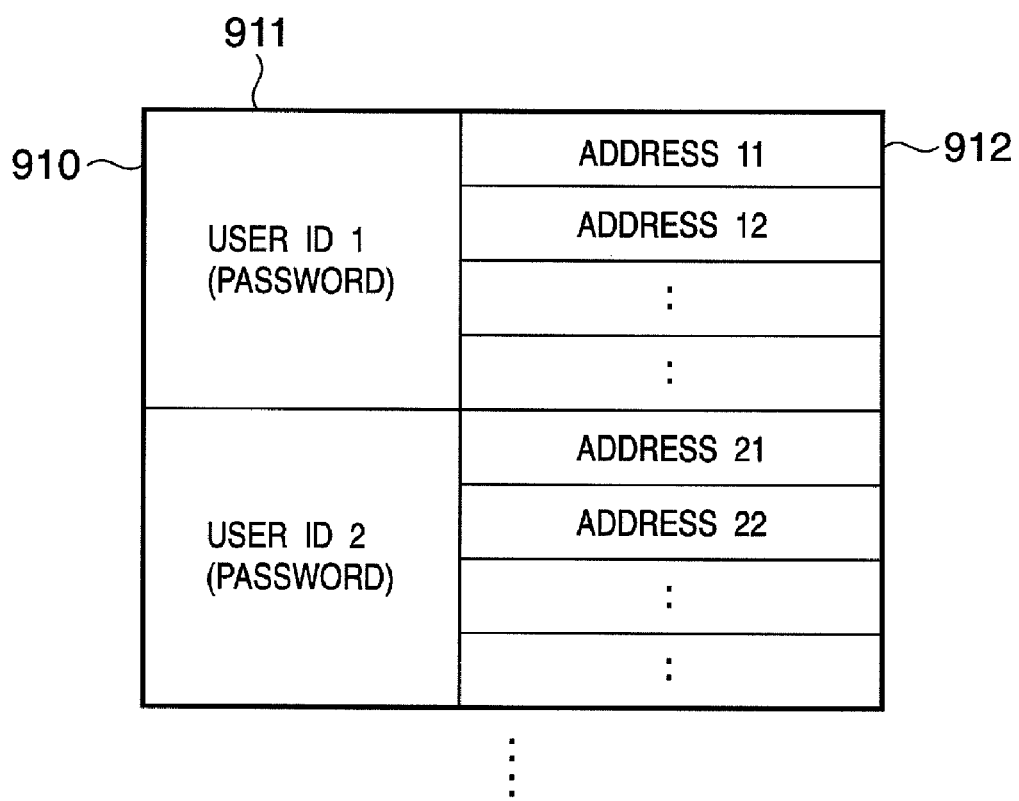
FIG. 9A is a table showing an example of address book data and destination information.
Figure 9B:
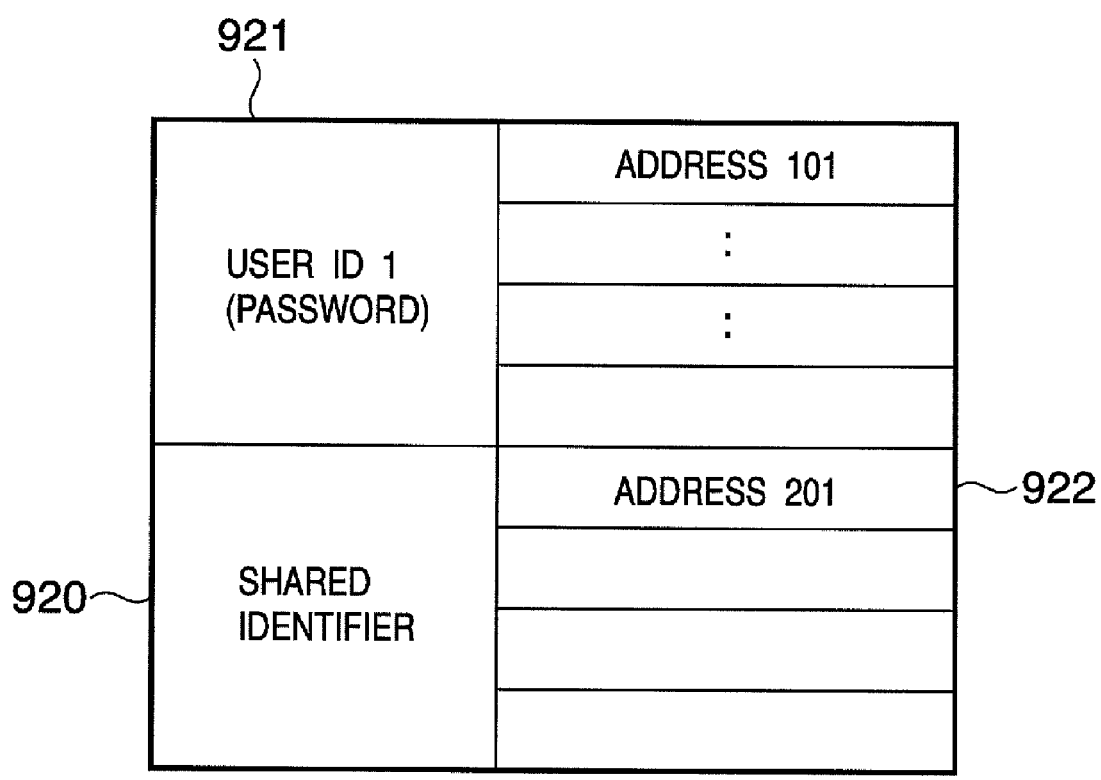
FIG. 9B is a table showing another example of the address book data and destination information.
Figure 9C:
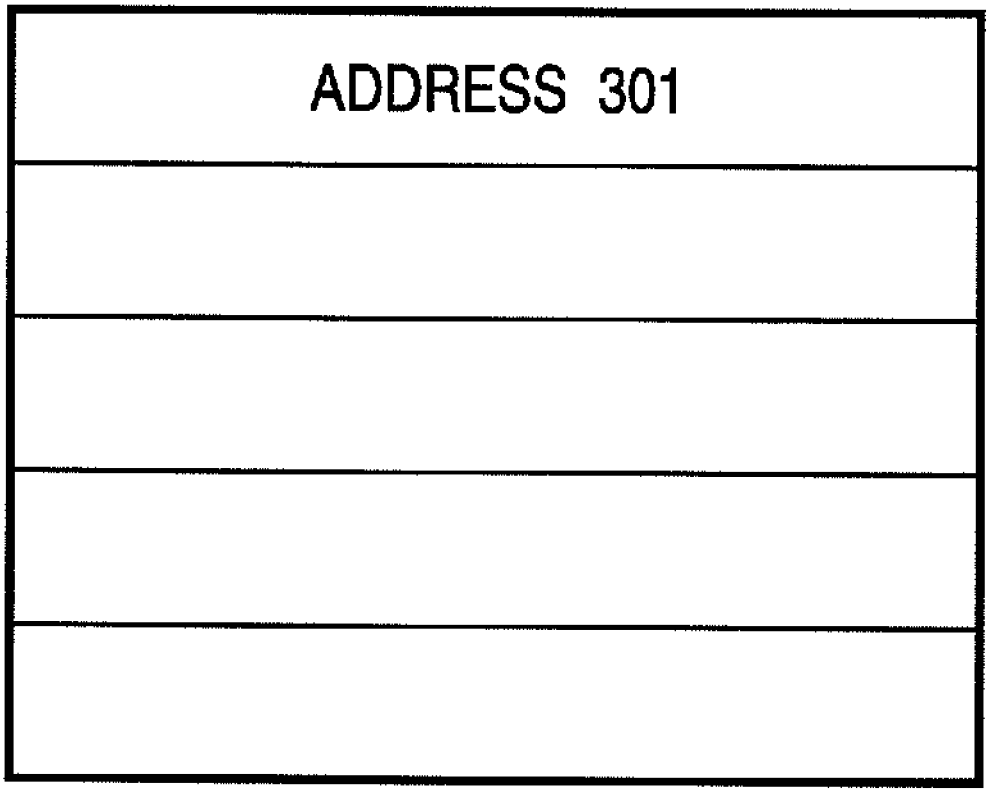
FIG. 9C is a table showing still another example of the address book data and destination information.

FIGS. 9A to 9C show an example of the structure of address book data in the first embodiment, and FIG. 9D shows an example of the destination information 205d. FIG. 9A shows an example of address book data saved in the copying apparatuses 101 and 102. The address book data is divided into user blocks 911 corresponding to respective users. The user block 911 associates a user with destination data accessible by the user. One user block contains data (user data) 910 for specifying a user, and destination data 912 associated with the user. The user data 910 contains a user identifier (user ID) for identifying a user, and a password which is registered in advance in correspondence with the user identifier. The destination data 912 contains the name of a destination, and its electronic mail address and facsimile number. These data are saved for each user. The user block may contain only user data without any associated destination data.

FIG. 9B shows an example of address book data containing a shared block 921 in addition to the user block. Access to the shared block is not limited. In the shared block, a predetermined shared identifier representing that destination data is not associated with any user is saved in an area corresponding to user data. Destination data associated with the shared identifier can be utilized by unspecified users.

FIG. 9C shows an example of address book data saved in the copying apparatus 103. Since the copying apparatus 103 does not have the access control function, no user data is necessary. Thus, the address book data is formed from a collection of destination data in the searchable form. The address book data is represented by the table format in FIGS. 9A, 9B, and 9C, but may be described using tags defined in XML or the like, as described above.

FIG. 9D shows an example of the destination information 205*d* saved in the source copying apparatus 101. The destination information contains a device identifier 941 and function information 942. The device identifier 941 and function information 942 are associated with each other, and the function information 942 represents the function of an associated destination apparatus. In the example of FIG. 9D, the addresses of the copying apparatuses 102 and 103 are saved as device identifiers. The function information associated with the copying apparatus 102 shows that the copying apparatus 102 has the access control function, whereas the function information associated with the copying apparatus 103 shows that the copying apparatus 103 does not have the access control function.

The copying apparatus 101 can inquire whether or not the copying apparatuses 102 and 103 have an access control function from the copying apparatuses 102 and 103 via the network before an address-book data delivery process. SNMP (Simple Network Management Protocol) or other protocol is utilized to determine a copying apparatus having the access control apparatus.

<Address Book Data Delivery Process>

Figure 6:
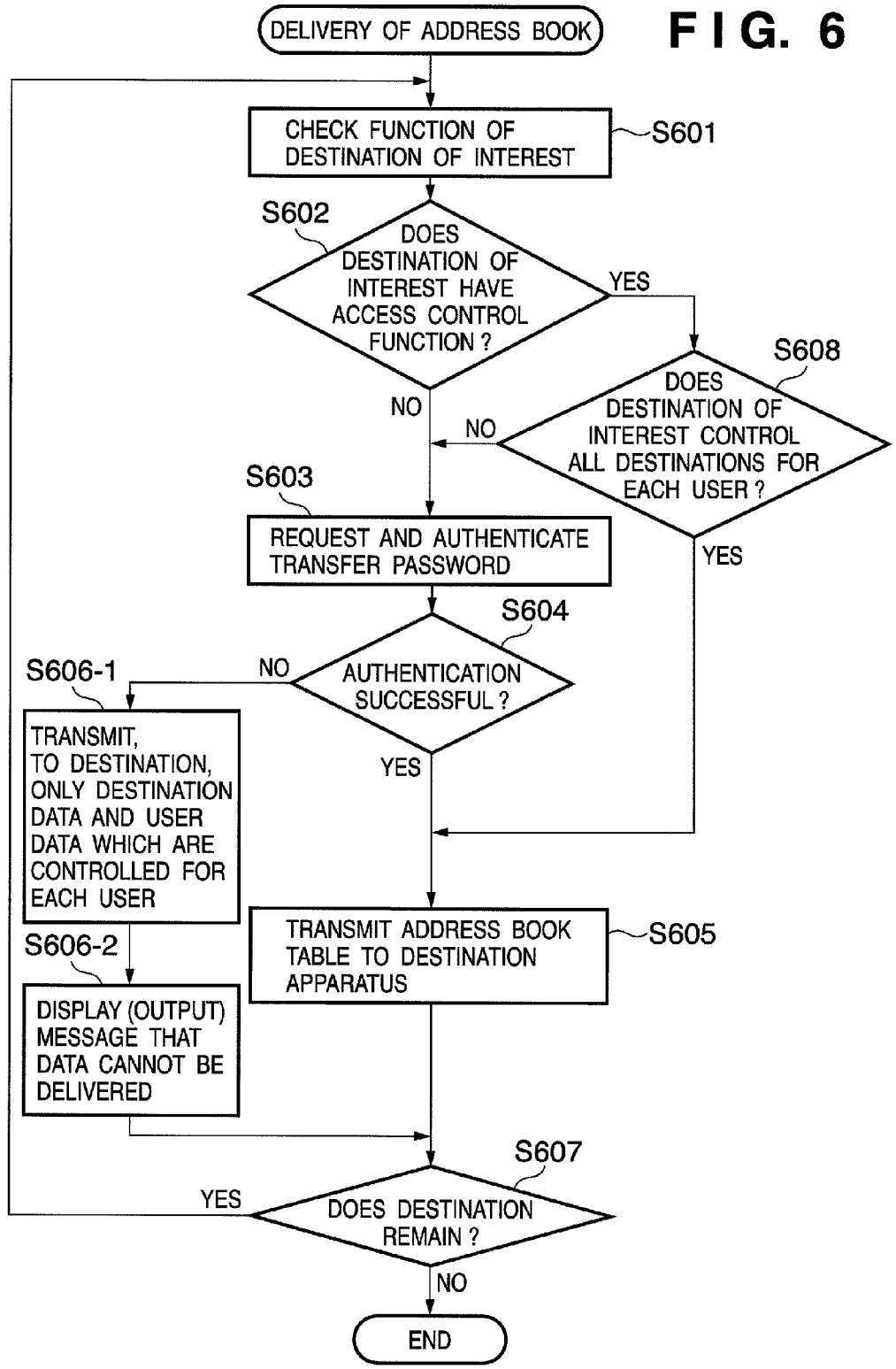
FIG. 6 is a flowchart showing a delivery process by a source copying apparatus in the first embodiment of the present invention.

A process of delivering address book data from the copying apparatus 101 in FIG. 1 to the copying apparatus 102 will be explained with reference to the flowcharts in FIGS. 6, 7A, and 7B. FIG. 6 is a flowchart showing a process executed by the MFP control unit 203 of the copying apparatus 101 when the copying apparatus 101 delivers address book data to the copying apparatus 102. This flowchart starts when the delivery button 301 in FIG. 3 is pressed.

In step S601, the function of a destination of interest is checked by referring to the destination information 205*d*. The destination of interest is one destination selected from the destination information 205*d* in, e.g., arrangement order. Hence, the first destination of interest is a destination specified by a device identifier registered at the start of the destination information 205*d*. In the example of FIG. 9D, the first destination of interest is the copying apparatus 102. Function information associated with the destination of interest is read.

In step S601, it is determined from the readout function information whether the destination of interest has the access control function. If it is determined that the destination of interest has the access control function, the flow branches to step S608 to determine whether all destination data contained in address book data saved in the source apparatus are controlled for each user. That is, if the address book data contains a shared ID, as shown in FIG. 9B, it can be determined that all destination data are not controlled for each user. For this determination, the following method can be adopted. More specifically, a request for a list of user data contained in the address book data is transmitted to the destination of interest. If a response to the request is received from the destination apparatus of interest, user data contained in the received user data list is collated with user data contained in the address book data of the source copying apparatus. If the received user data list contains user data contained in the address book data saved in the source copying apparatus as a result of collation, it can be determined that the destination of interest controls all destinations in the address book of the source apparatus for each user. Note that the password of one user may be different between apparatuses, so the password is not collated.

If it is determined in step S608 that the destination of interest controls all destinations in the address book of the source apparatus for each user, the flow branches to step S605 to transmit the address book table to the destination of interest. In this example, the address book data is described in the XML format, and the destination is an address registered in destination information. For descriptive convenience, the address book data will be explained with reference to FIGS. 9A, 9B, and 9C and the like.

If it is determined in step S608 that the destination of interest does not control all destinations in the address book of the source apparatus for each user, the flow branches to step S603 to request the administrator to input authentication information, e.g., a transfer password. If it is determined in step S602 that the destination of interest does not have the access control function, the flow branches to step S603 to request the administrator to input a transfer password.

If the administrator who performed the address book data delivery operation inputs the transfer password, the transfer password is collated with the password data 205*c*. If the transfer password coincides with the password data 205*c*, information representing that authentication is successful is temporarily saved in the memory unit 205. If the transfer password does not coincide with the password data 205*c*, or password input is skipped, information representing that authentication fails is temporarily saved in the memory unit.

In step S604, it is determined whether authentication is successful. If authentication is successful, the flow branches to step S605 to transmit the address book table to the destination apparatus of interest. If NO in step S602, the destination apparatus of interest does not require any user data. In this case, no user data need be transmitted.

If it is determined in step S604 that authentication fails, the flow branches to step S606-1. In step S606-1, if there is destination data controlled for each user by the destination copying apparatus of interest, the destination data and associated user data are transmitted to the destination of interest. For example, the source stores address book data in FIG. 3, and the destination of interest stores address book data in FIG. 4. In this case, destination data associated with users A, B, and C are controlled for the respective users even at the destination of interest. In contrast, users D, E, and F are not registered in the address book data of the destination of interest, and destination data associated with these users are not controlled for the respective users. For this reason, if it is determined in step S604 that authentication fails, only destination data associated with users A, B, and C are transmitted to the destination of interest in step S606-1. If the destination apparatus of interest does not have the access control function, no data is transmitted in step S606-1. In step S606-2, a message that data except the data transmitted in step S606-1 cannot be delivered is displayed on the operation unit 204. In the above-described examples of FIGS. 4 and 5, destination data associated with users D, E, and F cannot be delivered, and a message to this effect is displayed in step S606-2.

After step S606-2 or S605, the flow branches to step S607. In step S607, it is determined whether a destination of no interest which is registered in the destination information 205d remains. If the destination of no interest remains, the next (undelivered) destination is set as the destination of interest, and the flow branches to step S601.

As described above, in delivering destination data which is not controlled for each user by the destination apparatus, input of authentication information is requested, and if no authentication information is input, no destination data is delivered. It can be prevented in advance to access address book data in the destination apparatus without any limitation.

Figure 7A:
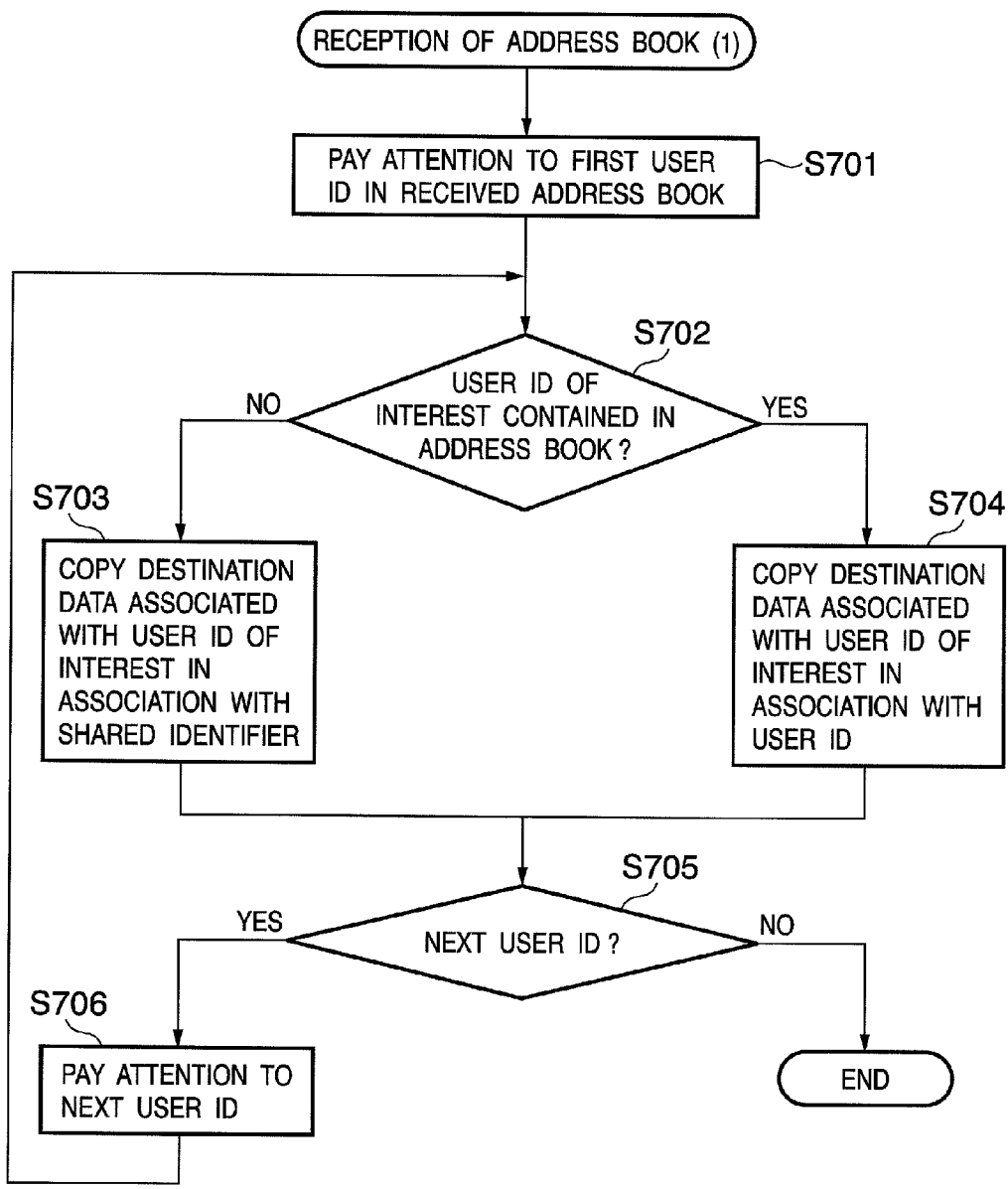
FIG. 7A is a flowchart showing a reception process by a destination copying apparatus in the first embodiment of the present invention.

FIG. 7A is a flowchart showing a process when a destination copying apparatus (e.g., the copying apparatus 102) having the access control function receives address book data transmitted in step S605 or step S606-1 of FIG. 6. In step S701, attention is paid to the first user data, especially, the user ID in user data contained in the received address book data. It is determined whether the user ID of interest is registered in the address book data of the destination apparatus (S702). If the user ID of interest is registered, destination data which is contained in the received address book data and associated with user data of interest is registered in the address book data of the destination copying apparatus (S704). The registered destination data is associated with user data having the same user ID as that of the user data of interest. At this time, the administrator may be prompted to select whether to register the destination data by adding or overwriting it. Alternatively, the registration method may be determined in advance.

If it is determined in step S702 that no user data of interest is registered in the address book data of the destination apparatus, the flow branches to step S703. In step S703, destination data which is contained in the received address book data and associated with user data of interest is registered in the address book data of the destination copying apparatus in association with the shared identifier. More specifically, if destination data associated with a user whose data is not controlled by the destination apparatus is delivered, access limitation on the destination data is canceled.

After steps S703 and S704, it is determined in step S705 whether user data other than user data of interest exists in the received address book data. If user data other than user data of interest exists, attention is paid to the next user data (S706), and the flow repeats from step S702.

Since tags contained in the received address book data represent user data and destination data associated with the user data, the user data and destination data can be extracted from the address book data. Even if no tag is set, data can be shared as far as field codes or the like which are defined in advance are shared between the source apparatus and the destination apparatus.

If user data (common user data) common to the source apparatus and destination apparatus are detected in the above manner, destination data associated with the common user data is controlled for each user even in the destination apparatus. That is, access is permitted or limited for each user.

Figure 7B:
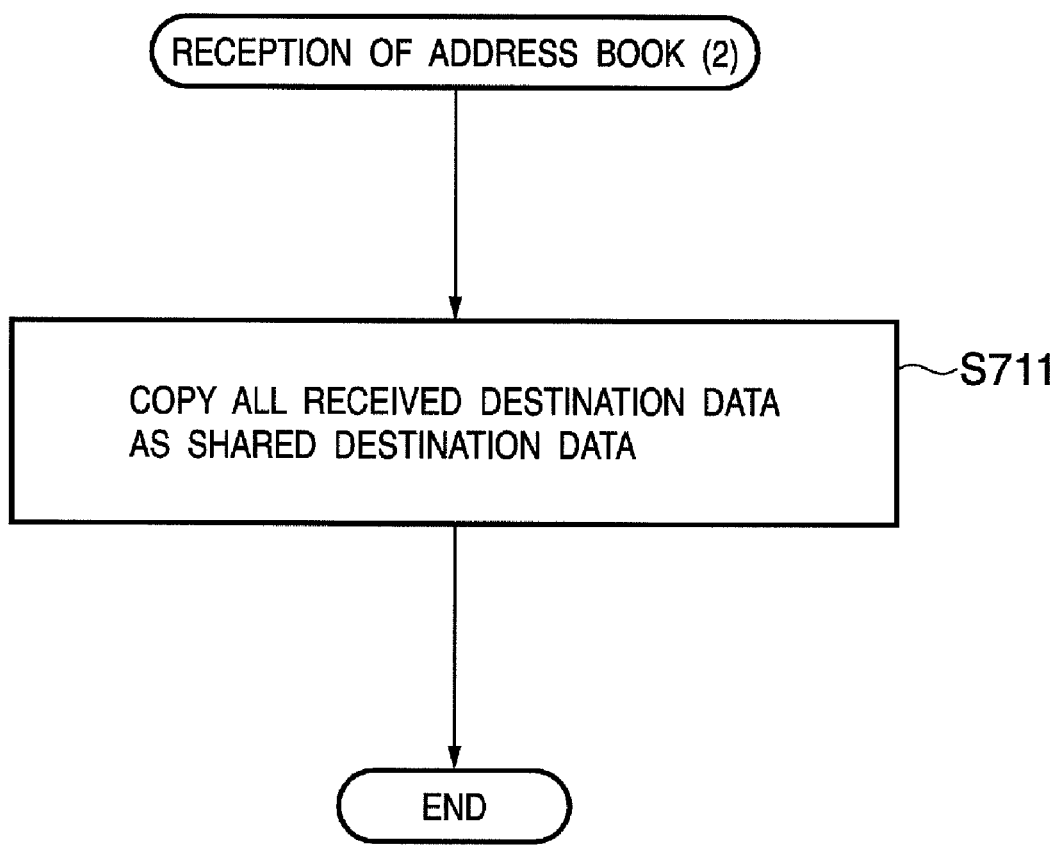
FIG. 7B is a flowchart showing a reception process by the destination copying apparatus in the first embodiment of the present invention.

FIG. 7B shows an example of process procedures when a copying apparatus having no access control function, e.g., the copying apparatus 103 receives address book data. In step S711, all destination data contained in the received address book data are registered in the address book data of the destination apparatus. Whether to register destination data by adding or overwriting it is selected by the administrator or determined in advance.

<Access to Address Book Data>

Figure 8:
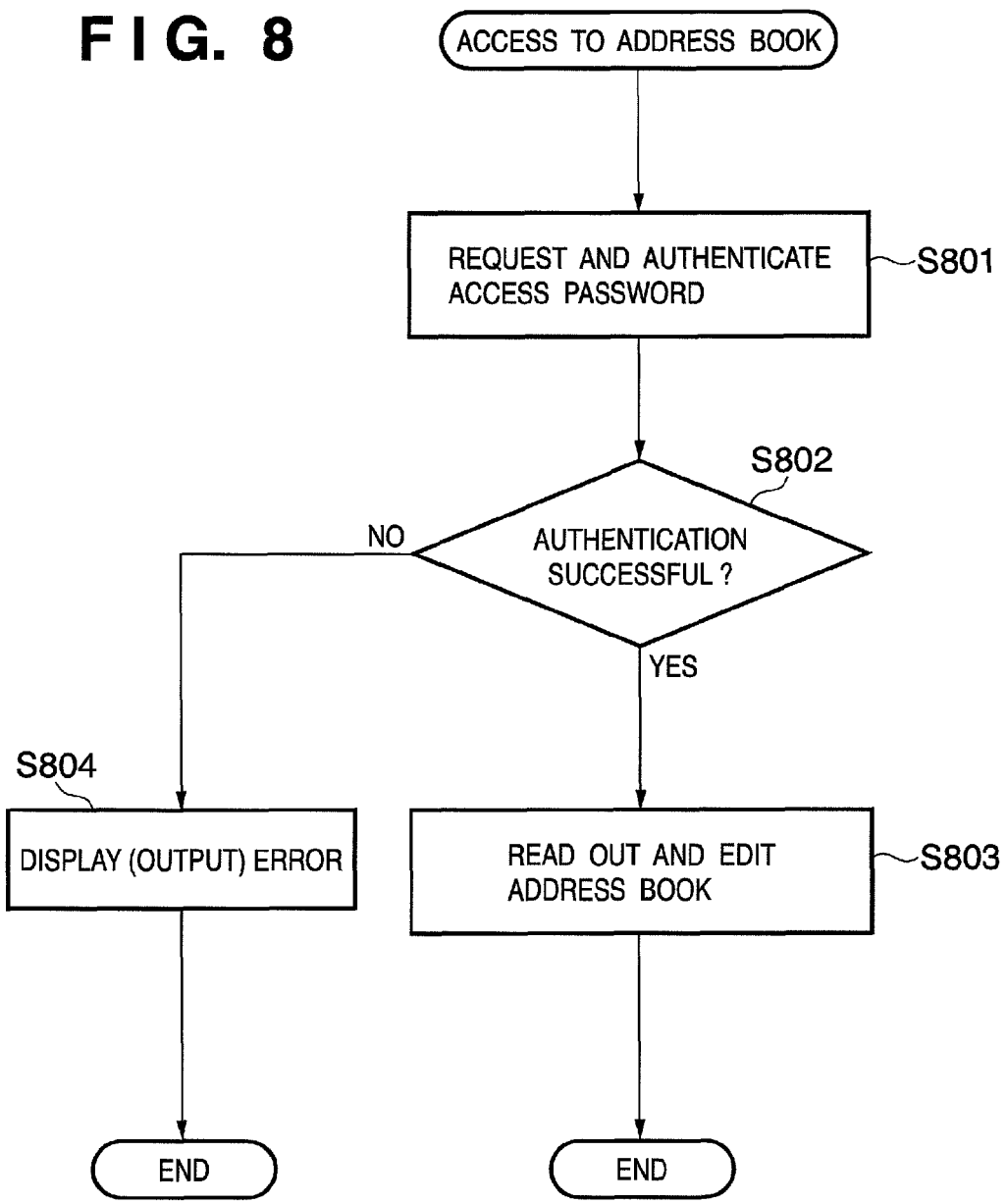
FIG. 8 is a flowchart showing a process of accessing address book data in the copying apparatus according to the present invention.

FIG. 8 shows process procedures when address book data is accessed in a copying apparatus having the access control function. For example, FIG. 8 shows procedures when an operation to, e.g., press the user display field 302 is done in the display window of FIG. 3 to request access to destination data associated with a specific user.

It is requested to input access authentication information, e.g., a password corresponding to a user who requested access. The user who requested access corresponds to a pressed user display field. As described with reference to FIG. 9A, authentication information (collation password) for each user is also saved in user data contained in address book data. The password is registered when a user is registered in address book data. In step S801, if the password is input in response to the request, the input password is collated with a password which is saved in the address book data as part of user data of the user who requested access. If the two passwords coincide with each other, authentication is successful; if they do not coincide with each other, authentication fails. In step S802, it is determined whether authentication is successful or fails. If authentication is successful, destination data associated with the user is read out from the address book data and displayed (step S803). If authentication fails, an error is displayed, and the process ends (step S804).

An electronic mail address, facsimile number, or the like is selected from the destination data displayed in step S803, and electronic mail or a facsimile is transmitted to the selected destination. Alternatively, the selected destination data undergoes an editing process or the like.

In this way, address book data controlled for each user can be delivered to another apparatus. In delivery, for destination data which is not controlled for each user at the destination, i.e., destination data, access to which becomes unlimited, an operator who requested the operation is authenticated, and delivery is permitted to only an operator having predetermined authority. Address book data can be strictly controlled at the source.

<Modification>

Destination data makes the name of a destination correspond to a facsimile number and electronic mail address, and address book data is a database which can be searched on the basis of destination data and the name. Hence, the destination data is personal information capable of specifying an individual, and is personal data which is registered in the database in a format searchable by a computer. The present invention is not limited to destination data, and can also be applied to general personal data, access to which is permitted to a user having predetermined authority. For example, the present invention can be similarly applied to an address book which is controlled by an electronic mail program installed in a personal computer or the like. An address book controlled by a mail destination printing program, and information controlled by a business card control program also contain personal information. The present invention can also be applied to these data.

In addition to the personal information, the embodiment can also be applied to document data or the like, access to which is permitted to only a user having predetermined access authority. When all or part of the document data is transmitted, transmission to an apparatus incapable of controlling the document data can be limited. In other words, the present invention can also be applied to general limited-access data in addition to personal information. This also applies to the second embodiment.

The first embodiment has described delivery of all address book data. The present invention can also be applied to a case where some address book data, e.g., destination data associated with selected user data, is delivered. This case is different from the first embodiment in that data to be transmitted are not all address book data but are some selected data. However, the data structure and process procedures are the same as those described in the first embodiment. Note that delivery of some address book data can also be applied to the second embodiment.

Second Embodiment

Figure 11:
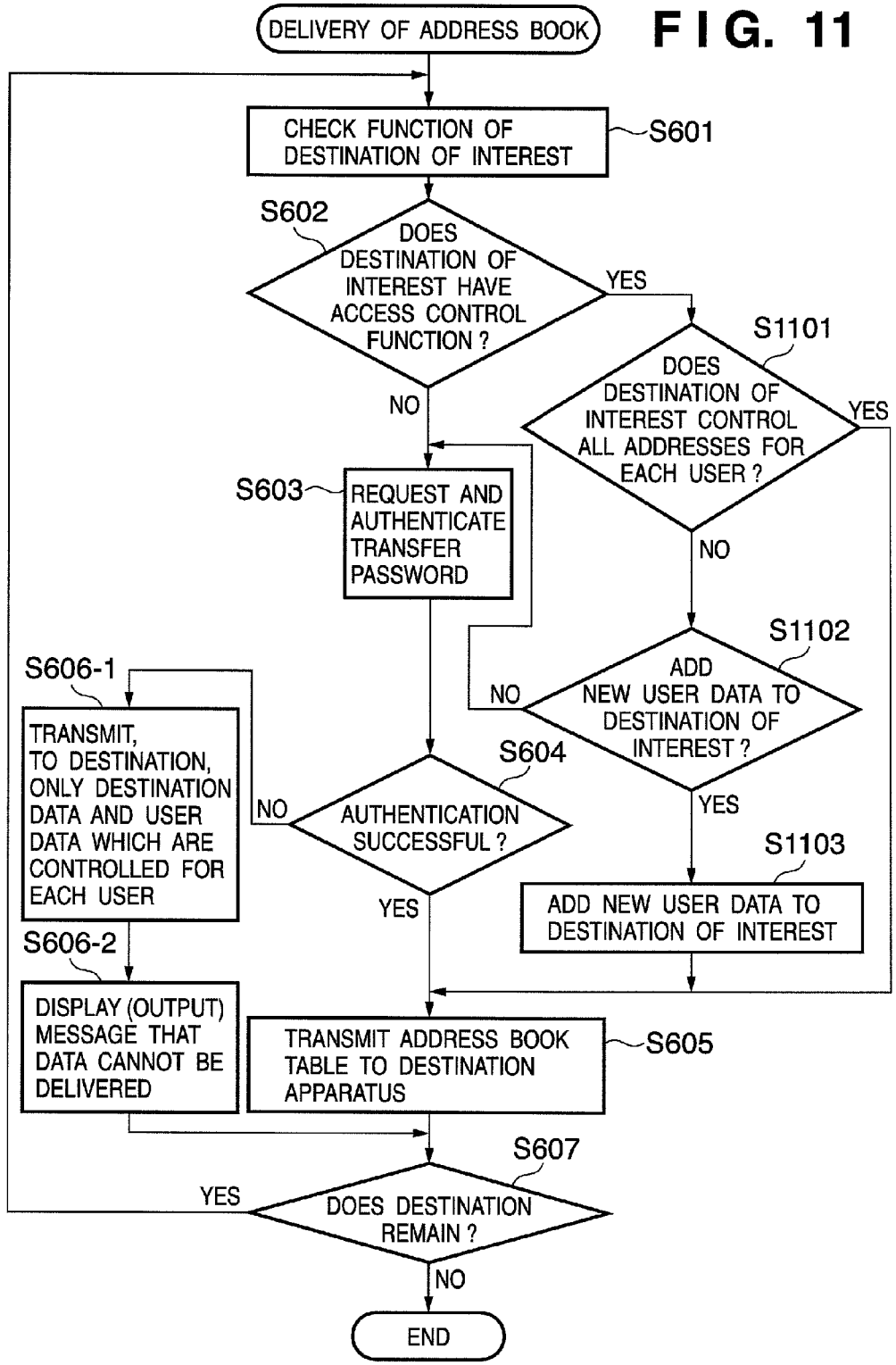
FIG. 11 is a flowchart showing a delivery process by the source copying apparatus according to the second embodiment of the present invention.

FIG. 11 shows procedures when a user is newly registered in address book data of a copying apparatus 102 and destination data is also registered in association with the user in delivering destination data of the user whose data is not controlled by the copying apparatus 102 in FIG. 2. The same reference numbers as those in FIG. 6 denote steps common to those in FIG. 6, and a description of these steps will be omitted.

Figure 10:
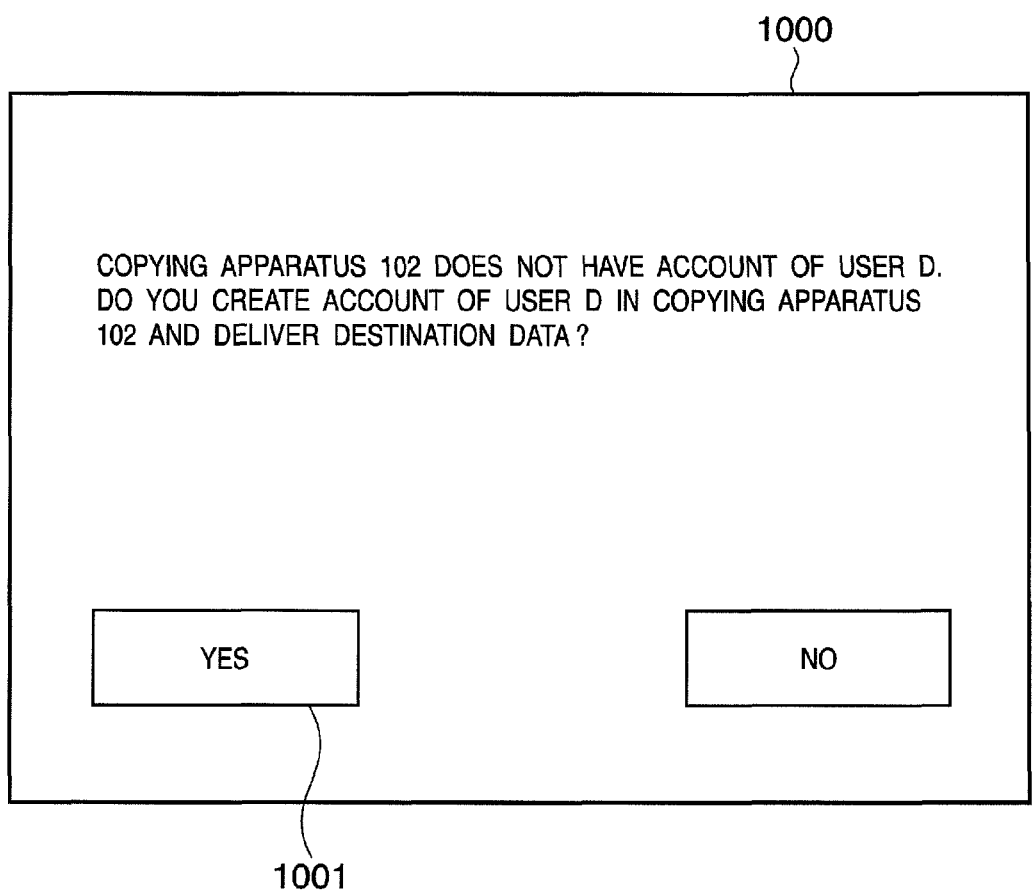
FIG. 10 is a view showing an example of a confirmation window displayed on the source copying apparatus according to the second embodiment of the present invention.

If it is determined in step S602 that the destination of interest has the access control function, the flow branches to step S1101. In step S1101, it is determined whether the destination apparatus of interest controls, for each user, all destination data contained in address book data saved in the source apparatus. The determination contents are the same as those in FIG. 6. In FIG. 11, step S1101 is different from step S608 in that, if NO in step S1101, the flow branches to step S1102. In step S1102, the operator is prompted to confirm whether to newly add user data to address book data saved in the destination apparatus of interest. For this purpose, a confirmation message and a button for selecting whether to add user data are displayed on an operation unit 204. FIG. 10 shows this example. If a "YES" button 1001 is pressed to select addition, the flow branches from step S1102 to step S1103. Then, the new user data is added to the destination of interest (step S1103). The user data is added by reading out user data contained in address book data to be delivered from the source apparatus, and transmitting the readout user data to the destination apparatus. Upon reception of the user data, the destination apparatus adds, to address book data, user data which is contained in the received user data but is not contained in the address book data of the destination apparatus. Since the destination data associated with the added user data is registered in step S605, no destination data exists in step S1103. If addition of user data is not selected in step S1102, the flow branches to step S603. Steps S603, S604, S605, S606-1, S606-2, and S607 are the same as those in the first embodiment.

Note that addition of user data is also called addition of a user account. In FIG. 10, user data is displayed as a user account.

In the example of FIG. 11, addition of user data and that of associated destination data are executed in different phases. However, addition of user data and that of associated destination data can also be executed in a single phase. In this case, all address book data of the source apparatus are transmitted to the destination in step S1103. Upon reception of the address book data, the destination apparatus registers all user data contained in the received address book data, and then registers associated destination data. The registered user data desirably contains an access password for access limitation. This is because no access is limited unless the access password is registered. No existing user data need be added. In this case, no destination data need be transmitted separately, and the flow branches to step S607 after transmission.

In this fashion, user data which is not registered in address book data saved in a destination apparatus can be registered in delivering address book data. When a copying apparatus having the access control function delivers address book data to another copying apparatus having it, all limited-access destination data can be transmitted to the destination apparatus while access limitation is kept imposed.

In the first and second embodiments, data is desirably encrypted in transmitting address book data. Especially in the second embodiment, a password for registering user data is also transmitted, and encryption is indispensable.

In the above embodiments, destination information is manually input by the administrator. On the other hand, when destination information is held in a predetermined format in each copying apparatus, the source copying apparatus polls destination information saved in each destination copying apparatus in, e.g., a system in which copying apparatuses of the same model are connected. Accordingly, the source apparatus can collect destination information.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-264424 filed on Sep. 12, 2005, which is hereby incorporated by reference herein in its entirety.

What is claimed is:

1. A data delivery apparatus comprising:
a storage adapted to store limited-access data which associates user data for specifying a user, with data, access to which is permitted or limited to the user;
a function determination unit adapted to determine whether a destination device to which the limited-access data is to be transmitted has an access control function of permitting or limiting access to the limited-access data for each user;
an authentication unit adapted to, when the limited-access data destination device is determined not to have the access control function, request input of authentication information and performing an authentication process using the input authentication information;
a transmission control unit adapted to, when the authentication process by said authentication unit is successful, transmitting the limited-access data to the destination device; and
a discrimination unit adapted to, when said function determination unit determines that the limited-access data destination device has the access control function, discriminate user data stored in the destination device and corresponding shared user data among user data stored in said storage,
wherein when data associated with user data other than the shared user data among the user data stored in said storage is to be transmitted, said authentication unit further requests input of authentication information and performs an authentication process using the input authentication information, and
when the authentication process is successful, said transmission control unit transmits, to the destination device, data associated with the user data other than the shared user data among the user data stored in said storage.

2. The apparatus according to claim 1, wherein said transmission control unit transmits data associated with the shared user data to the destination device without the authentication process.

3. The apparatus according to claim 1, wherein the limited-access data includes address book data which contains destination information for transmitting data, and access to which is permitted or limited for each user.

4. The apparatus according to claim 1, further comprising an image forming unit adapted to form a hard copy of an image.

5. A data delivery apparatus comprising:
a storage adapted to store limited-access data which associates user data for specifying a user, with data, access to which is permitted or limited to the user;
a function determination unit adapted to determine whether a destination device to which the limited-access data is to be transmitted has an access control function of permitting or limiting access to the limited-access data for each user;
an authentication unit adapted to, when the limited-access data destination device is determined not to have the access control function, request input of authentication information and performing an authentication process using the input authentication information;
a transmission control unit adapted to, when the authentication process by said authentication unit is successful, transmitting the limited-access data to the destination device;
a discrimination unit adapted to, when said function determination unit determines that the limited-access data destination device has the access control function, discriminate user data stored in the destination device and corresponding shared user data among user data stored in said storage; and
a registration unit adapted to register, in the destination device, user data other than the shared user data among the user data stored in said storage,
wherein when said function determination unit determines that the limited-access data destination device has the access control function, said transmission control unit transmits all the limited-access data to the destination device without the authentication process.

6. A data delivery method of delivering limited-access data which is stored in a storage, and which associates user data for specifying a user, with data, access to which is permitted or limited to the user, the method comprising:
a function determination step of determining whether a destination device to which the limited-access data is to be transmitted has an access control function of permitting or limiting access to the limited-access data for each user;
an authentication step of, when the limited-access data destination device is determined not to have the access control function, requesting input of authentication information and performing an authentication process using the input authentication information;
a transmission control step of, when the authentication process in the authentication step is successful, transmitting the limited-access data to the destination device; and
a discrimination step of, when the limited-access data destination device is determined in the function determination step to have the access control function, discriminating user data stored in the destination device and corresponding shared user data among user data stored in the storage,
wherein in the authentication step, when data associated with user data other than the shared user data among the user data stored in the storage is to be transmitted, input of authentication information is further requested and an authentication process is performed using the input authentication information, and
wherein in the transmission control step, when the authentication process is successful, data associated with the user data other than the shared user data among the user data stored in the storage is transmitted to the destination device.

7. The method according to claim 6, wherein in the transmission control step, data associated with the shared user data is transmitted to the destination device without the authentication process.

8. The method according to claim 6, wherein the limited-access data includes address book data which contains destination information for transmitting data, and access to which is permitted or limited for each user.

9. A data delivery method of delivering limited-access data which is stored in a storage, and which associates user data for specifying a user, with data, access to which is permitted or limited to the user, the method comprising:
- a function determination step of determining whether a destination device to which the limited-access data is to be transmitted has an access control function of permitting or limiting access to the limited-access data for each user;
- an authentication step of, when the limited-access data destination device is determined not to have the access control function, requesting input of authentication information and performing an authentication process using the input authentication information;
- a transmission control step of, when the authentication process in the authentication step is successful, transmitting the limited-access data to the destination device;
- a discrimination step of, when the limited-access data destination device is determined in the function determination step to have the access control function, discriminating user data stored in the destination device and corresponding shared user data among user data stored in the storage; and
- a registration step of registering, in the destination device, user data other than the shared user data among the user data stored in the storage,
- wherein in the transmission control step, when the limited-access data destination device is determined in the function determination step to have the access control function, all the limited-access data are transmitted to the destination device without the authentication process.

10. A program, recorded on a computer readable non-transitory storage medium, for causing a computer to execute a data delivery method for delivering limited-access data which is stored in a storage, and which associates user data for specifying a user, with data, access to which is permitted or limited to the user, the method comprising:
- a function determination step of determining whether a destination device to which the limited-access data is to be transmitted has an access control function of permitting or limiting access to the limited-access data for each user;
- an authentication step of, when the limited-access data destination device is determined not to have the access control function, requesting input of authentication information and performing an authentication process using the input authentication information;
- a transmission control step of, when the authentication process in the authentication step is successful, transmitting the limited-access data to the destination device; and
- a discrimination step of, when the limited-access data destination device is determined in the function determination step to have the access control function, discriminating user data stored in the destination device and corresponding shared user data among user data stored in the storage,
- wherein in the authentication step, when data associated with user data other than the shared user data among the user data stored in the storage is to be transmitted, input of authentication information is further requested and an authentication process is performed using the input authentication information, and
- wherein in the transmission control step, when the authentication process is successful, data associated with the user data other than the shared user data among the user data stored in the storage is transmitted to the destination device.

11. The program according to claim 10, wherein in the transmission control step, data associated with the shared user data is transmitted to the destination device without the authentication process.

12. The program according to claim 10, wherein the limited-access data includes address book data which contains destination information for transmitting data, and access to which is permitted or limited for each user.

13. A program, recorded on a computer readable non-transitory storage medium, for causing a computer to execute a data delivery method for delivering limited-access data which is stored in a storage, and which associates user data for specifying a user, with data, access to which is permitted or limited to the user, the method comprising:
- a function determination step of determining whether a destination device to which the limited-access data is to be transmitted has an access control function of permitting or limiting access to the limited-access data for each user;
- an authentication step of, when the limited-access data destination device is determined not to have the access control function, requesting input of authentication information and performing an authentication process using the input authentication information;
- a transmission control step of, when the authentication process in the authentication step is successful, transmitting the limited-access data to the destination device;
- a discrimination step of, when the limited-access data destination device is determined in the function determination step to have the access control function, discriminating user data stored in the destination device and corresponding shared user data among user data stored in the storage; and
- a registration step of registering, in the destination device, user data other than the shared user data among the user data stored in the storage,
- wherein in the transmission control step, when the limited-access data destination device is determined in the function determination step to have the access control function, all the limited-access data are transmitted to the destination device without the authentication process.

* * * * *